No. 872,362. PATENTED DEC. 3, 1907.
A. L. MUREN.
PNEUMATIC SPRING AND SHOCK ABSORBER FOR MOTOR VEHICLES.
APPLICATION FILED OCT. 18, 1906.
2 SHEETS—SHEET 1.
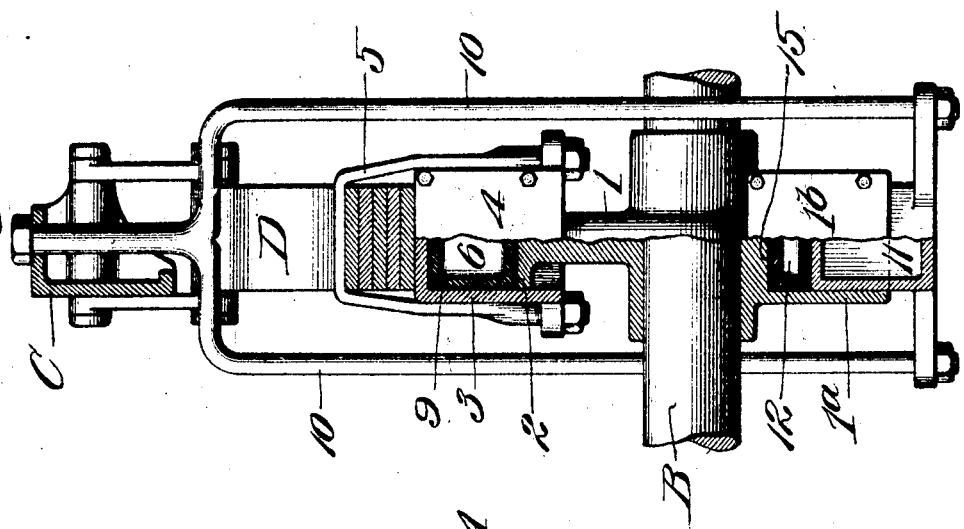
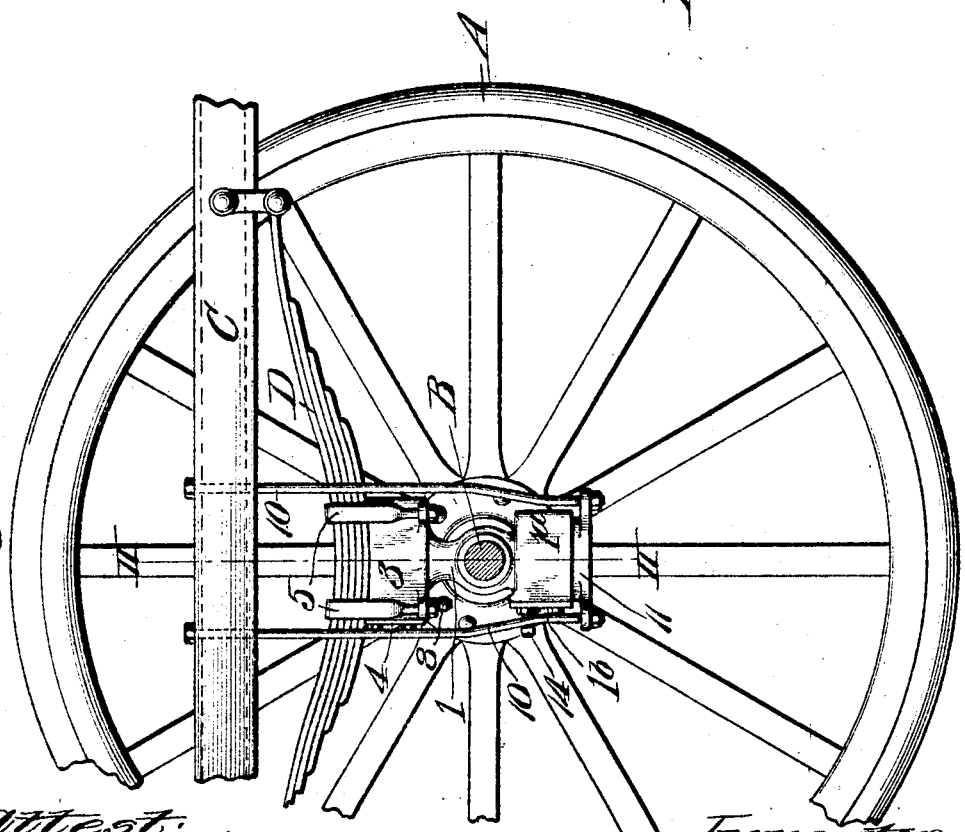

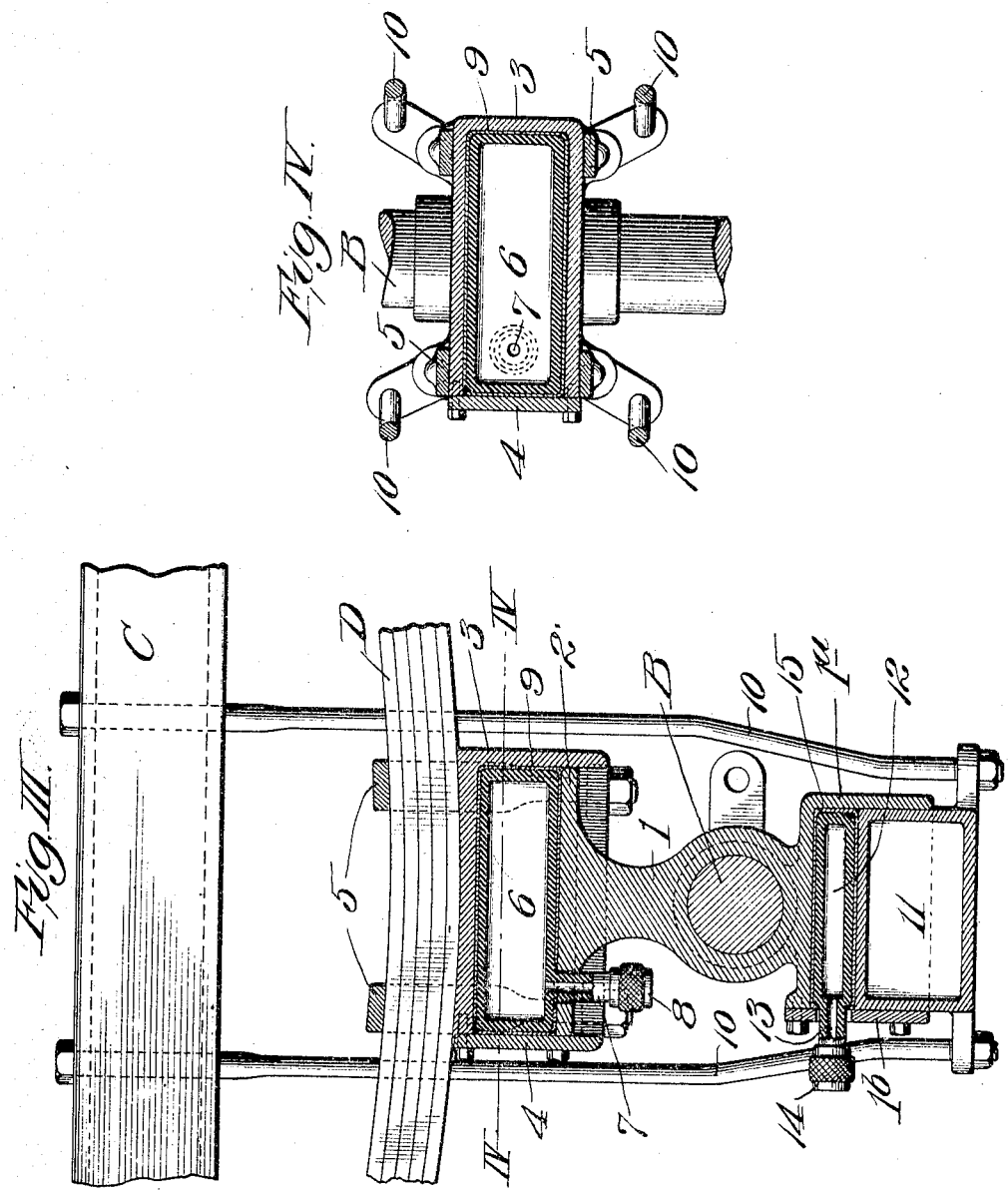

UNITED STATES PATENT OFFICE.

ALBERT L. MUREN, OF BELLEVILLE, ILLINOIS.

PNEUMATIC SPRING AND SHOCK-ABSORBER FOR MOTOR-VEHICLES.

No. 872,362.　　　Specification of Letters Patent.　　　Patented Dec. 3, 1907.

Application filed October 18, 1906. Serial No. 339,432.

*To all whom it may concern:*

Be it known that I, ALBERT L. MUREN, a citizen of the United States of America, residing in Belleville, in the county of St. Clair and State of Illinois, have invented certain new and useful Improvements in Pneumatic Springs and Shock-Absorbers for Motor-Vehicles, of which the following is a full, clear, and exact description, reference being had to the accompanying drawings, forming part of this specification.

My invention relates to pneumatic devices for use in motor vehicles or other forms of vehicles to avoid jarring of the vehicle frame or body and yieldingly overcome or compensate for shocks due to rebound of the vehicle frame or body when the vehicle wheels strike against any obstruction encountered or move into ruts or depressions in the road over which they are traveling.

Figure I is an elevation of portions of a vehicle ground wheel and frame and my pneumatic spring and shock absorber associated with said parts. Fig. II is an enlarged vertical cross section taken on line II—II, Fig. I. Fig. III is an enlarged view partly in vertical section and partly in elevation of the spring and shock absorber members. Fig. IV is a horizontal section taken on line IV—IV, Fig. III.

A designates a vehicle ground wheel, B an axle mounted in said wheel, C part of the frame of the vehicle, and D an ordinary spring connected to said frame.

1 designates a pedestal mounted upon the axle B and provided at its upper end with a head 2.

3 is an upper compression box or member that is provided with a detachable wall 4 forming a part thereof and which is dependingly connected to the spring D by shackles 5 or other suitable means. The compression box is closed at its top and open at its bottom, and the walls of said box which surround the head of the pedestal 1 are loosely fitted to said pedestal so as to permit vertical movement of the box relative to the stationary pedestal 1.

6 designates a pneumatic cushion in the form of an inflatable bag which is located within the upper compression box and seated on the head of the pedestal 1 to serve when inflated as a yielding support for said upper compression box. The pneumatic cushion is provided with a depending neck 7 that extends through the head of the pedestal and is equipped with a valve nipple 8 to which a pump may be applied for the purpose of forcing air into said cushion to inflate it in order that the desired spring action may be acquired. For the protection of the pneumatic cushion which is preferably made of rubber, I incase said cushion in a flexible casing 9, which may be of leather or other suitable material, which obviates abrasion of the cushion by the parts surrounding it.

10 designates hanger rods suspended from the vehicle frame C. 11 is a lower compression member supported by said hanger rods so as to project upwardly and located beneath the axle B and the main pedestal 1. The main pedestal is provided with a depending resistance member or box 1$^a$ that is slidably fitted to said lower compression member and provided with a detachable wall 1$^b$. The resistance member 1$^a$ is closed at its top and open at its bottom in order that its walls may operate slidably against the lower compression member which they surround.

12 designates a pneumatic shock absorbing cushion that is located between the top of the lower compression member 11 and the upper end of the resistance member 1$^a$, this cushion being in the form of an inflatable bag preferably made of rubber. The cushion is provided with a neck 13 that extends to the exterior of the resistance member 1$^a$ and is equipped with a valve nipple 14 to which a pump may be applied for the purpose of inflating said cushion. For the purpose of preventing abrasion of the cushion it is preferably incased within a flexible casing 15.

In the practical use of my pneumatic spring and shock absorber, the pneumatic cushion affords cushioning action for the vehicle frame and other parts supported by the running gear of the vehicle to relieve such parts of jar to the same intent as pneumatic or other yielding vehicle wheel tires commonly used, and the pneumatic cushion by its location furnishes all of the requisite action of the character named without liability of wear or injury such as the wheel tires are subject to. The shock absorbing cushion serves to yieldingly overcome the rebound incident to a sudden downward movement of the vehicle parts supported by the running gear, as a result of which the pneumatic cushion is compressed.

Attention is called to the fact that due to the upper compression member 3 and lower resistance member 1$^a$ being provided with detachable walls the pneumatic shock absorbing cushions may be readily withdrawn from the boxes within which they are seated and replaced by other corresponding parts, or for repairs when needed.

I claim:—

1. In a vehicle, the combination with an axle and frame, of an upwardly projecting compression member suspended beneath said axle from said frame, a resistance member beneath said axle above said compression member and slidingly connected therewith, and a pneumatic shock absorbing cushion located between said compression member and said resistance member; said resistance member being of box shape and having a detachable wall, substantially as set forth.

2. In a vehicle, the combination with an axle and frame, of a pedestal carried by said axle and having a head above the axle, and a resistance member below the axle, an upper pneumatic cushion mounted on said head, an upper compression member resting on said upper pneumatic cushion and having connection with said frame, a lower upwardly projecting compression member suspended from said frame and located beneath said axle, and a lower pneumatic shock absorbing cushion located between said lower compression member and the resistance member of said pedestal, substantially as set forth.

3. The combination, with a frame, an axle, and a spring located between the frame and the axle; of a depending upper compression box, means whereby the upper compression box is suspended from the spring, an upwardly projecting lower compression box, means whereby the lower compression box is suspended from the frame, a pedestal mounted upon the axle and having an upwardly projecting head, with which the upper compression box is slidingly connected, and a depending resistance box with which the lower compression box is slidingly connected, a pneumatic cushion located between the head and the upper end of the upper compression chamber, and a pneumatic cushion located between the lower compression box and the upper end of the resistance box.

4. The combination, with a frame, an axle, and a spring located between the frame and the axle; of a depending upper compression box, means whereby the upper compression box is suspended from the spring, an upwardly projecting lower compression box, means whereby the lower compression box is suspended from the frame, a pedestal mounted upon the axle and having an upwardly projecting head, with which the upper compression box is slidingly connected, and a depending resistance box with which the lower compression box is slidingly connected, a pneumatic cushion having a flexible casing and located between the head and the upper end of the upper compression chamber, and a pneumatic cushion having a flexible casing and located between the lower compression box and the upper end of the resistance box.

ALBERT L. MUREN.

In presence of—
  H. L. MUREN,
  EDMUND BURKE.